Re. 24703
Aug. 16, 1955          E. BRAME          2,715,312
JET SPOILER FOR GAS TURBINE JET PROPULSION PLANT
Original Filed July 18, 1946          6 Sheets-Sheet 1
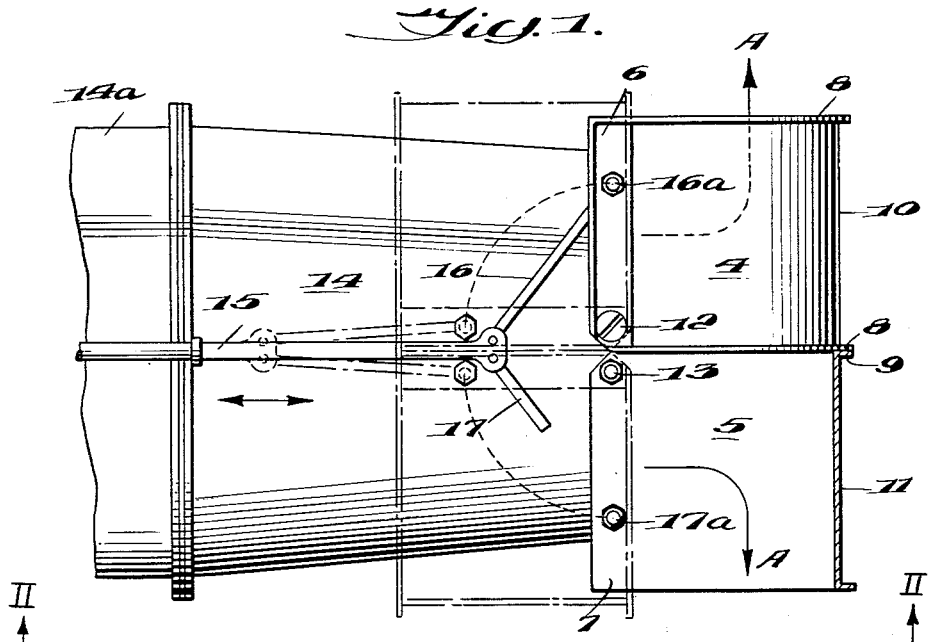
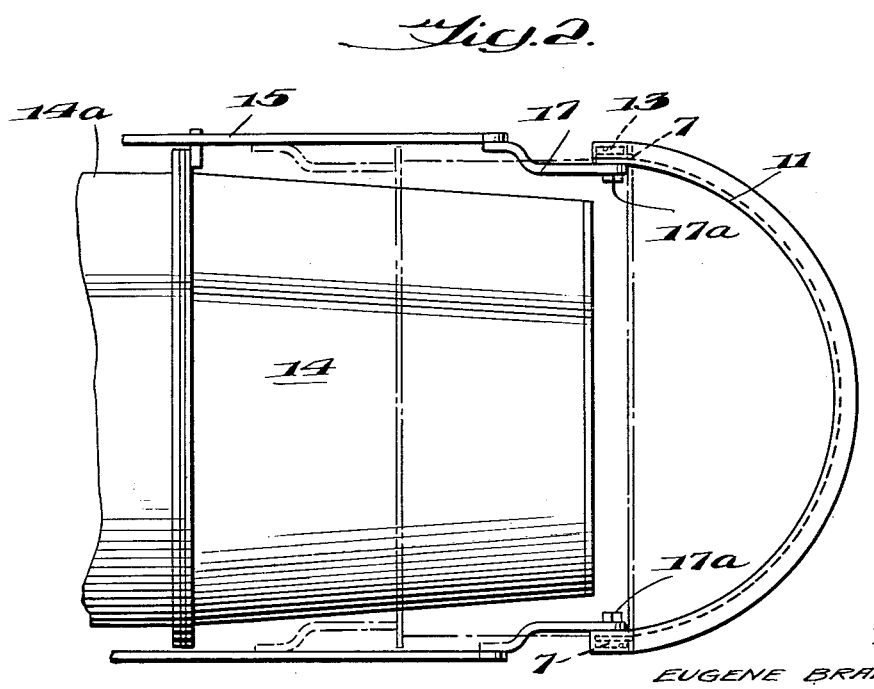
INVENTOR
EUGENE BRAME,
BY Robert B. Pearson
ATTORNEY

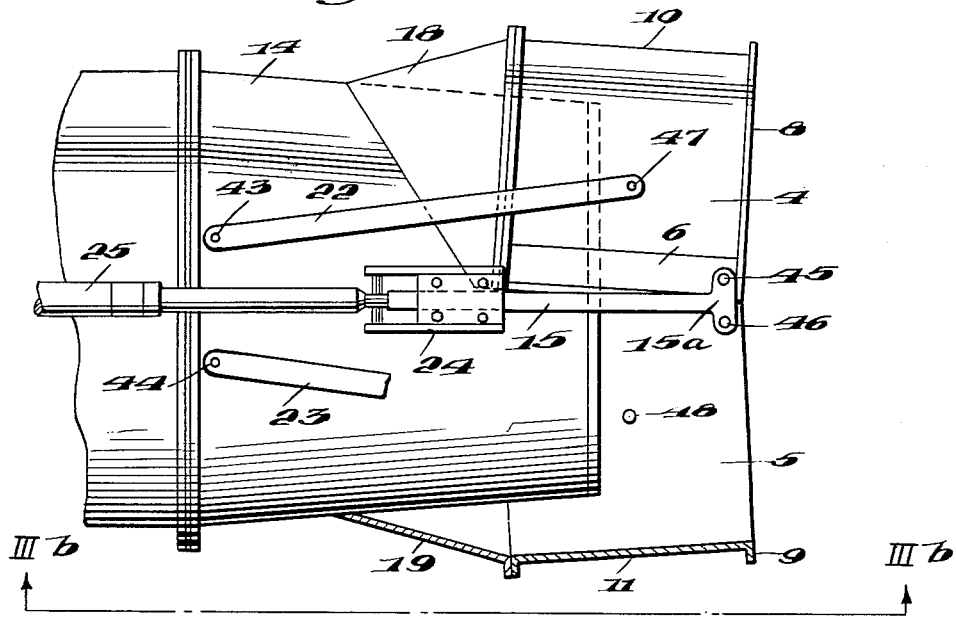
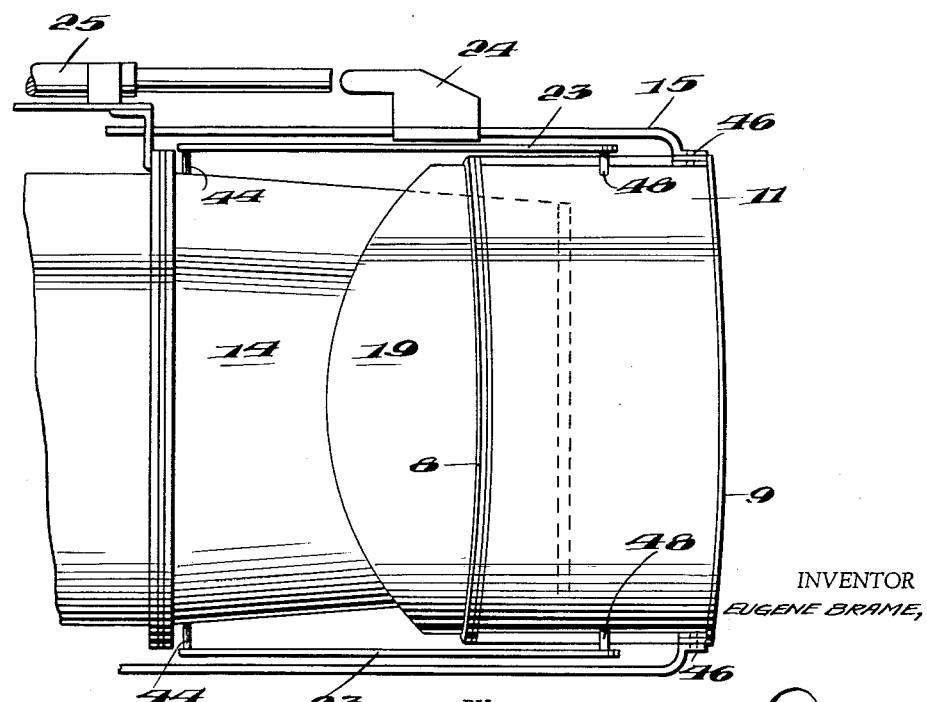

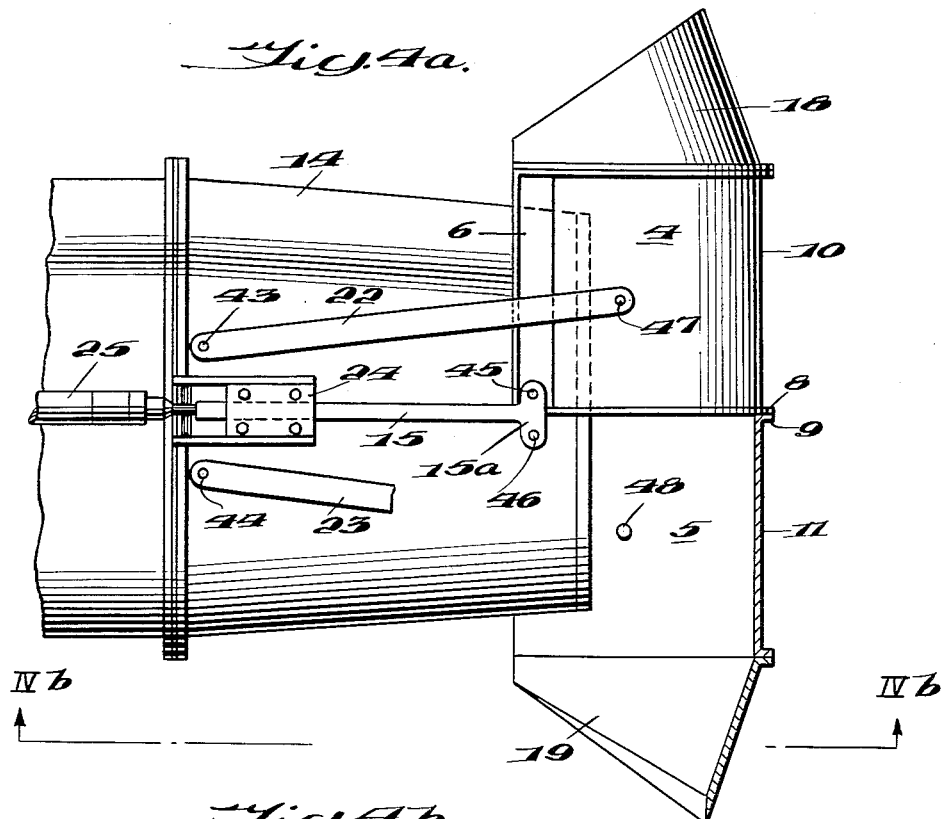
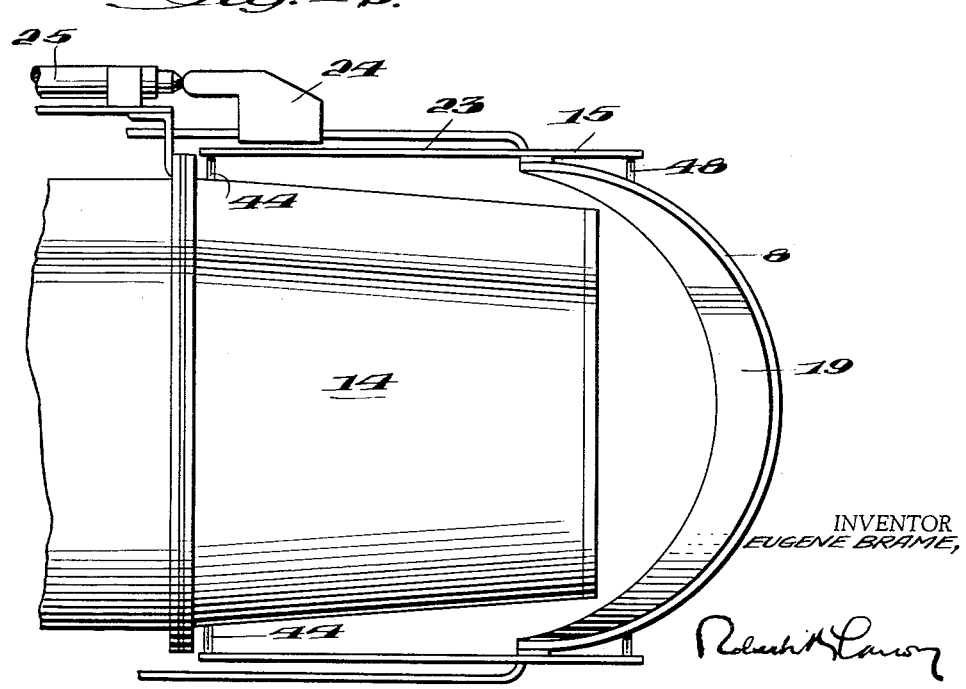

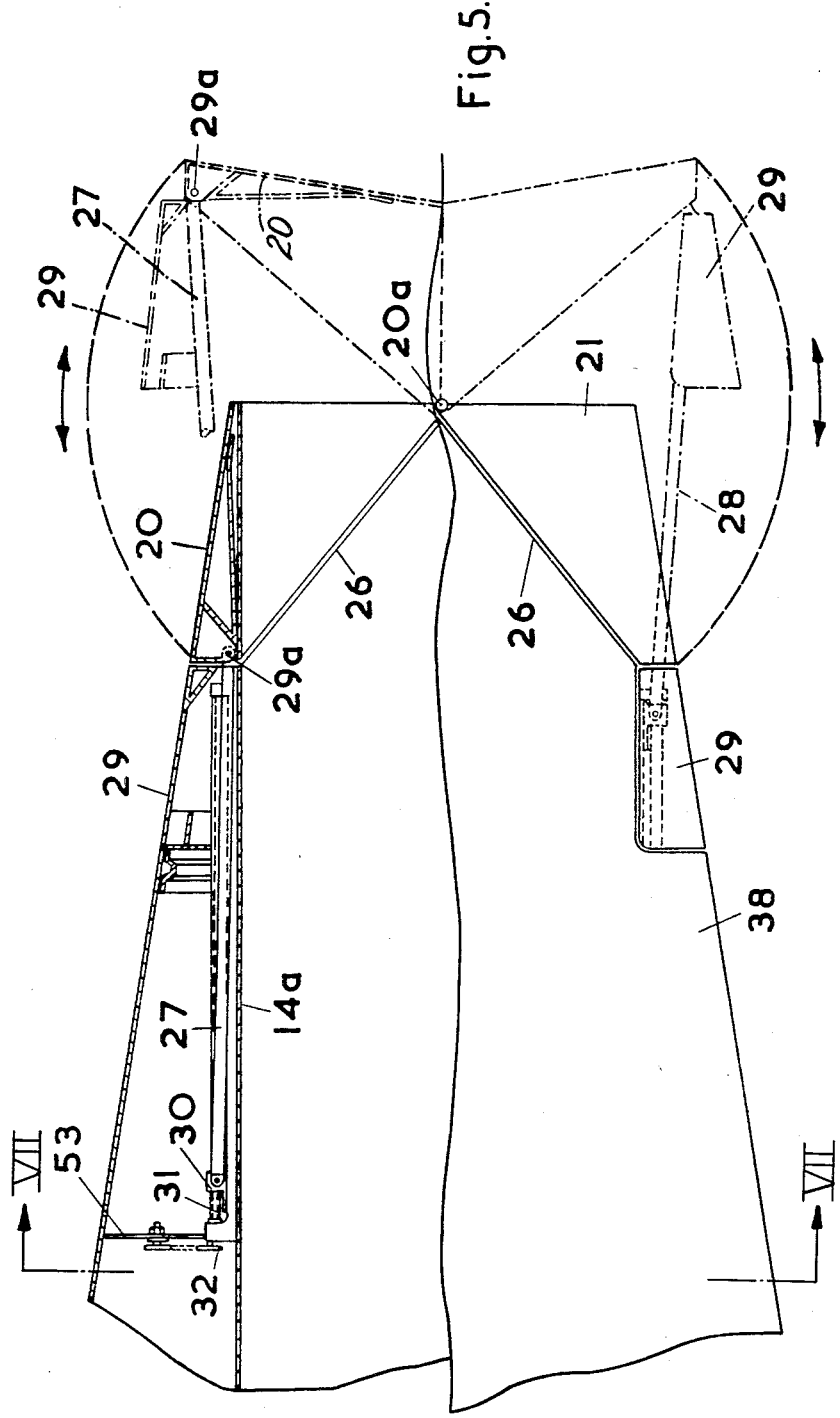

Aug. 16, 1955  E. BRAME  2,715,312
JET SPOILER FOR GAS TURBINE JET PROPULSION PLANT
Original Filed July 18, 1946  6 Sheets-Sheet 5

Inventor
EUGENE BRAME,
By
Attorney

Aug. 16, 1955 E. BRAME 2,715,312
JET SPOILER FOR GAS TURBINE JET PROPULSION PLANT
Original Filed July 18, 1946 6 Sheets—Sheet 6

Inventor
EUGENE BRAME,
By
Robert H Lawson
Attorney

United States Patent Office 2,715,312
Patented Aug. 16, 1955

2,715,312

JET SPOILER FOR GAS TURBINE JET PROPULSION PLANT

Eugene Brame, Farnborough, England, assignor to Power Jets (Research and Development) Limited, London, England, a British company Original application July 18, 1946, Serial No. 684,454. Divided and this application January 15, 1952, Serial No. 266,923

Claims priority, application Great Britain July 21, 1945

7 Claims. (Cl. 60—35.55)

This invention relates to jet reaction devices in which thrust is obtained from the reaction of a stream of ejected fluid. The invention has especial application to jet reaction devices for aircraft propulsion but is not necessarily limited to this application.

The present application is a division of copending application Serial No. 684,454, filed July 18, 1946, in the name of Johnstone, now abandoned and replaced by continuation application Serial No. 358,743, filed June 1, 1953.

An object of the invention is the provision of improved "spoiler" means for "spoiling" or deflecting the jet stream, so as to annul the thrust developed or, if desired, to develop thrust in the reverse direction. There are cases of need for such a device in jet propelled aircraft owing to the pronounced tendency to "float" in landing, due to the absence of propeller drag, and when deck or other short-run landing has to be provided for, a device that will not only "kill" the thrust of the jet altogether but will provide an appreciable degree of reversed or braking thrust, may be considered highly desirable. It may also be desirable to deflect and disperse a propulsive jet of an aircraft when the aircraft is stationary on the ground, to avoid inconvenience or damage to persons or objects behind the aircraft, and to relieve brakes and tires of heavy loads.

Further objects of the invention are to provide a jet spoiler device that will be simple, robust, reliable, easily and rapidly operated without calling for excessive operating forces, and when not in operation will not be exposed to excessive heating from the jet gases nor create excessive drag.

According to this invention a controllable jet spoiling device for use in association with a jet pipe and jet reaction nozzle comprises a pair of pivotally mounted jaw members so shaped and having their pivotal connections so disposed that in the non-spoiling position they fit around the end region of the jet pipe and in the spoiling position they form one or more baffles disposed in such relation to the open end of the said nozzle as to deflect a jet stream issuing from said nozzle.

The jaws in the spoiling position fit together to form a substantially continuous concave baffle and in the non-spoiling position the jaws fit together to form a hollow cylinder arranged concentrically around and in more or less close contact with the end of the jet pipe and reaction nozzle.

These jaws are preferably operated by push-pull rods movable in the axial direction of the jet and located close to the nozzle walls; and the said rods may be operated by electrically driven screw jacks or by hydraulic rams, or by any other convenient mechanism.

In some preferred forms of construction, the jaws are provided with cowl-like extensions, which serve to deflect the jet effluent in such a way that its flow is at least partially reversed, thus producing reversed or negative thrust, and such extensions may either be fixed to the jaw members or mounted in fixed relationship to the push-pull rods, being supported thereby on crossheads or the like, for instance. The pivotal connections of the jaw members may, according to a feature of the invention, be so disposed that the loads imposed by the jet stream on the jaw members during the opening and closing operations are at least partially self-balancing as regards their moments about the pivots, thus reducing the operating forces required and the loads transmitted by the operating mechanism.

In one form of construction the jaw members are directly pivoted to the nozzle or its supporting structure about an axis diametral of the nozzle cross section, the push-pull rods being connected to the jaw members by links; in another, the jaw members are pivoted to one another about such a diametral axis, the push-pull rods being connected at or adjacent to the pivot points, while the jaw members are slidably pivoted to the nozzle or supporting structure, or connected thereto by two pairs of pivoted links.

The nature of the invention and certain further features thereof will be more fully understood from the following description, having reference to the accompanying partly diagrammatic drawings and illustrating, by way of example, various embodiments of the invention.

In the drawings:

Figure 1 is a plan view of one embodiment of the invention, part being shown in section, with the spoiling members shown in their spoiling position in full lines and in their non-spoiling position in dash-dot lines.

Figure 2 is an elevational view looking in the direction of the arrows II—II in Figure 1.

Figures 3a and 3b are similar views of a second embodiment with the spoiling members shown in their non-spoiling position, Figure 3b being a view looking in the direction of the arrows IIIb—IIIb in Figure 3a.

Figures 4a and 4b are corresponding views of the second embodiment with the spoiling members shown in their spoiling position, Figure 4b being a view looking in the direction of the arrows IVb—IVb in Figure 4a.

Figures 5 and 6 are respectively a plan and an elevational view of a third embodiment of the invention, the spoiling members being shown in their non-spoiling position in full lines and in their spoiling position in dash-dot lines. The upper half of Figure 5 is a section on the line V—V in Figure 6.

Figure 6:
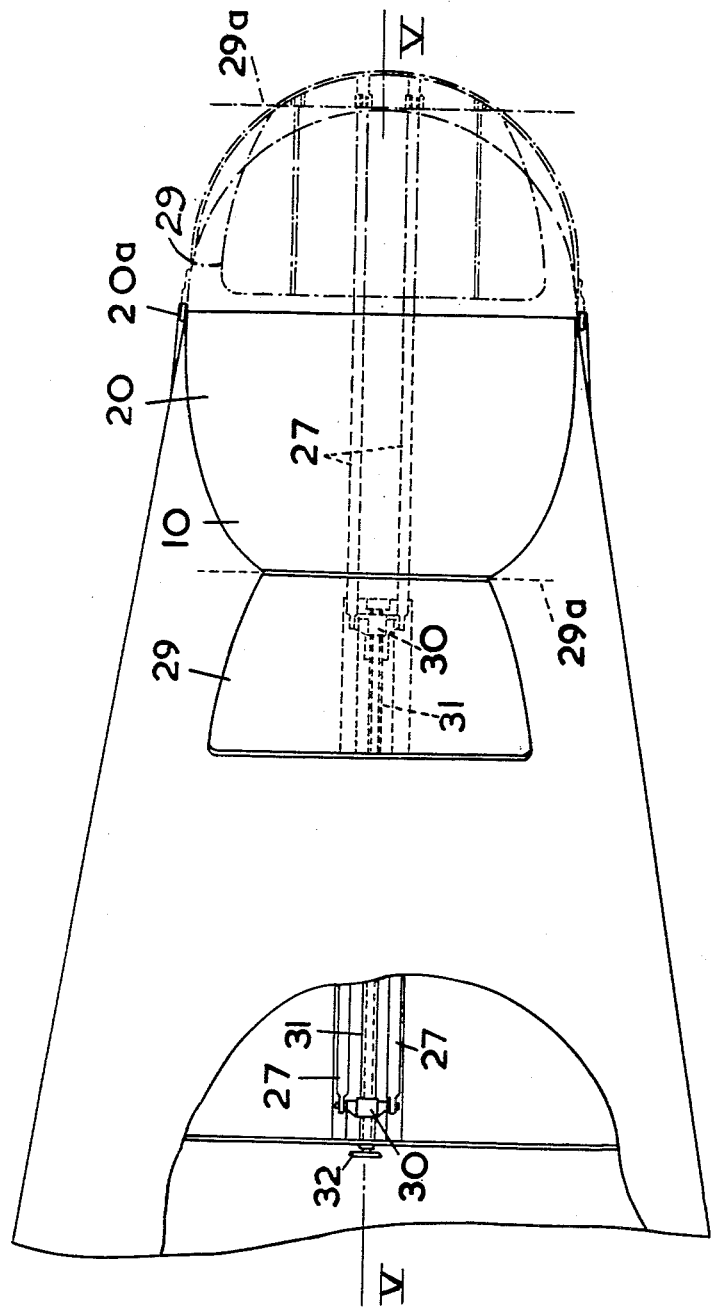

In the form of Figs. 1 and 2, the device is applied to the final propelling nozzle 14 of a jet-pipe 14a, and comprises mainly a pair of so-called jaws 10, 11, respectively pivotally mounted at 12, 13, on axes which are parallel and which lie nearly in a diameter of the opening of the nozzle 14. Each jaw is constituted by an almost semi-cylindrical structure 4, 5 of sheet-metal, appropriately stiffened by flanges 8, 9 around the peripheral and axial edges, and also by stiffening plates 6, 7 along the axial edge. To each is pivoted, respectively at 16a, 17a, a pair of pivoted links 16, 17 (upper and lower links forming a pair 16 or a pair 17), and the other ends of the links are pivoted to push-pull rods 15 which are operated by suitable means to swing the jaws from a non-spoiling position (shown in dotted lines), to a spoiling position (shown in full lines). In the non-spoiling position the jaws 10, 11, form in effect, a cylindrical shroud around the nozzle 14, when they are inoperative. In the spoiling position, they fall to lie (regarding them as semi-cylinders) on a common cylinder-axis which is at right angles to the jet, and they then deflect the jet laterally, as illustrated by the arrows A of Fig. 1. Appropriate design measures are taken to react the loads which may be transmitted through the jet pipe 14a in this embodiment, as also in the other variants about to be described.

In the form of Figs. 3a, 3b, 4a and 4b, there is a certain general similarity with that of Figs. 1 and 2, but there are two important differences; one is the provision for some reversal of thrust, the other relates to the operating connections. Figures 3a and 3b show the non-spoiling position, and Figures 4a and 4b show the spoiling position. The nozzle 14 is as before, but now the jaws 10, 11 which are reinforced in the same way as described with reference to Figures 1 and 2 are carried pivotally by upper and lower links 22, 23, which act as radius rods anchored pivotally to the fixed structure of the nozzle 14 at 43, 44 respectively and to the jaws at 47, 48 respectively. The jaws 10, 11 are interconnected, and connected to an operating push-pull rod 15, through a fitting 15A which is rigid with rod 15 and to which the jaws 10, 11 are pivoted at 45, 46 respectively. Each jaw 10, 11, has inclined extension cowl 18, 19 respectively to deflect the jet stream in the reverse direction or with an effective component of reversal. When the rod 15 is moved forwardly (to the left in the figures) from the position shown in Figure 3a to that shown in Figure 4a, the jaws 10, 11 close across pipe 14a as shown in Figure 4a. By moving the rod 15 rearwardly (to the right in the figures) the jaws 10, 11 are caused to open and then come together to form a tubular member coaxial with the jet pipe 14 as shown in Figure 3. By appropriate dimensioning and centering, the required operating load may be reduced since the jaws 10, 11 can be made to some extent self-balancing. It is proposed to operate the rod 15 by a jack such as 25, connected through a crosshead 24.

Figures 7, 8:
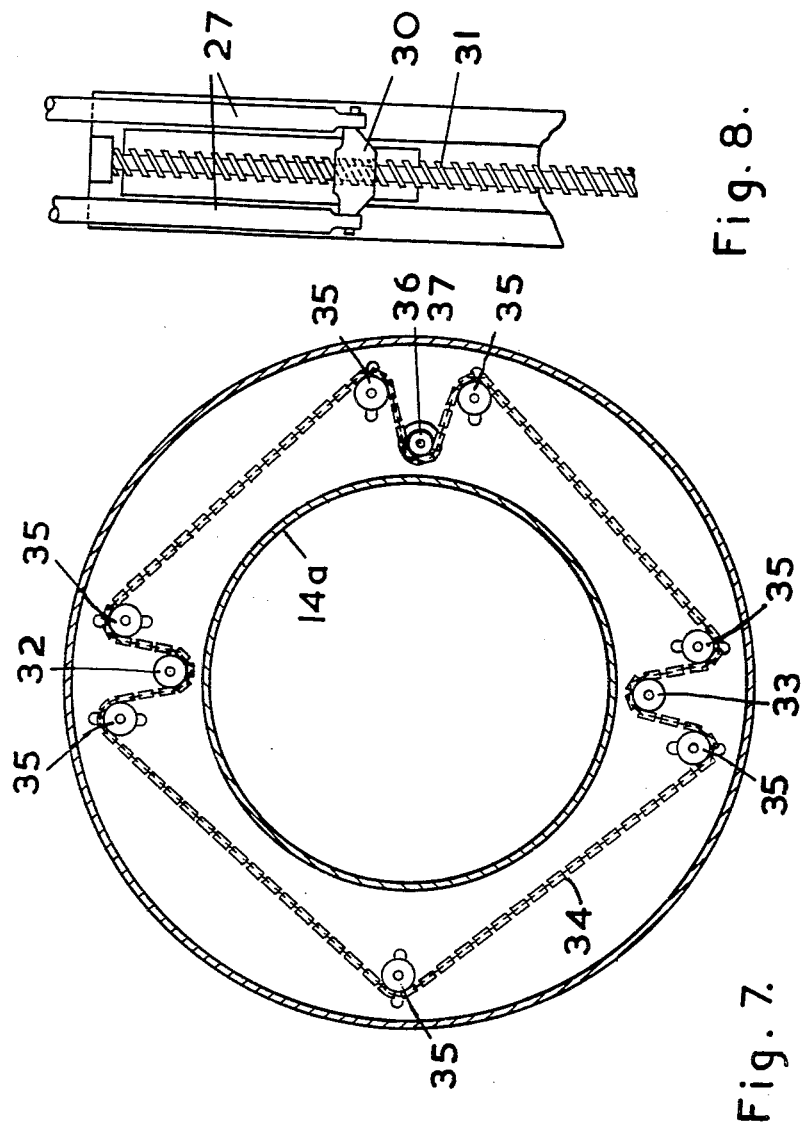
Figure 7 is a section on the line VII—VII in Figure 5.
Figure 8 is a detail of the mechanism for operating the spoiling members shown in Figures 5 and 6.

In Figs. 5–8 is illustrated a considerable departure, which is intended to be such as to conform with the requirements of a stream-lined nacelle or the like, by making the jet spoiler in such a way that its components nest together and are highly compact when inoperative. In this case, substantial reversal of thrust is catered for.

The jet pipe is represented at 14a; it is enclosed in a nacelle with a wall 38. The section of the nacelle (as of the pipe) is circular. Fig. 5 shows half the device in section and half in external elevation, and it can be seen that there are provided a pair of jaw elements 20, 21, formed, as it were by slicing off parts of the rear end of the nacelle diagonally, and these jaws are mutually pivoted to the pipe 14a, on an axis which lies in a diameter of the pipe, at 20a. In their non-spoiling position (full line in Fig. 5) these jaws conform with the profile of the nacelle. Upstream from the jaws 20, 21 a pair of cowl elements 29 is provided; these are again formed, as it were, by cutting out part of the nacelle wall 38, and they are pivotally attached to the jaws 20, 21 respectively, on hinge axes which are parallel with axis 20a, at 29a. These elements 29 are mounted rigidly on operating rods 27, 28 which lie within the nacelle close alongside the pipe 14a, and which are arranged in pairs for structural stiffness, each pair being pivoted to a guided nut 30 which rides on a threaded spindle 31 (see Fig. 8) borne in the fuselage and rotatable by a sprocket 32 (or 33) engaged by a chain 34 which passes over jockey pulleys such as 35 (Fig. 7), and is driven by a driving sprocket 36 motored at 37.

Rotation of spindles 31 by the chain system causes the rods 27, 28, to move—for example rearwardly. This causes the jaws 20, 21, to swing about axis 20a, ultimately meeting to form an effective jet spoiler. The elements 29 are carried rearwardly on the rods 27, 28 and, remaining contiguous with the jaws, form means for partially reversing the jet stream. When the direction of operation of the system is reversed, the parts 20, 21, 29 nest together, completing the profile of the nacelle wall 38 and closing in all the operative machinism. A bulkhead, such as 53 may mount the chain circuit and also prevent reversed jet gases from entering the main part of the nacelle.

Some of the jockey pulleys 35 may be adjustable radially of the jet orifice in order to ensure synchronization of the two screw jack devices operating the two jaws 20, 21, and to enable stretch of the chain 34 to be taken up.

I claim:

1. In an aircraft jet propulsion power plant having a jet pipe and nozzle for the rearward discharge of a propulsive jet stream, a jet spoiler comprising two similar substantially semi-cylindrical members fitting together in their non-spoiling position to form around said jet stream substantially a hollow cylinder mounted coaxially with and at the rearward end of said jet pipe and having its axis extending in the direction of the flow of the jet stream, said members having a common diameter in a plane normal to the direction of flow of the jet stream at their rearward extremities and being pivotally jointed together on opposite sides of the region of said common diameter, each being pivotable about substantially that diameter from said non-spoiling position through 90° to a spoiling position in which they lie end to end transverse to the jet stream with their concave sides facing upstream, and linkage mechanism connected to said members and operable to move them between said spoiling and non-spoiling positions.

2. In an aircraft jet propulsion power plant having a jet pipe and nozzle for the rearward discharge of a propulsive jet stream, a jet spoiler comprising two similar substantially semi-cylindrical members fitting together in their non-spoiling position to form around said jet stream substantially a hollow cylinder mounted coaxially with and at the rearward end of said jet pipe and having its axis extending in the direction of the flow of the jet stream, said members having a common diameter in a plane normal to the direction of flow of the jet stream at their rearward extremities, two connectors, one on each side of said members, adjacent to opposite ends of said common diameter of these members, movable together in a direction parallel to the jet stream, each of said members being pivotally mounted on said connectors for movement about substantially said diameter through 90° from said non-spoiling position to a spoiling position in which they lie end to end transversely across the jet stream with their concave sides facing upstream, and linkage mechanism between said members and a fixed part of the jet pipe constraining each of said members to turn through 90° from said non-spoiling position to the spoiling position during upstream movement of said connectors and to turn back again during downstream movement of said connectors.

3. In an aircraft jet propulsion power plant, a jet spoiler according to claim 2 in which said linkage mechanism consists of a pair of links for each said member, located on opposite sides thereof, each pair being pivoted at one end to the associated one of said members about an axis parallel to said common diameter but located forwardly thereof, and at the other end to the jet pipe fixed structure about another parallel axis, located still further forward.

4. In an aircraft jet propulsion power plant having a jet pipe and nozzle for the rearward discharge of a propulsive jet stream, a jet spoiler comprising a hollow substantially cylindrical member disposed around said jet stream coaxially with and at the rearward end of said jet pipe, said cylindrical member being bisected in an axial plane and the two parts thereof having a rearward common diameter lying in said plane and being pivotally jointed together where they meet at the rear on said plane, each being pivotable about substantially said common diameter in said plane from said position in which they form a cylindrical member to a spoiling position in which they lie end to end transverse to the jet stream with their concave sides facing upstream, and linkage mechanism connected to said parts and operable to move them between said two positions.

5. In an aircraft jet propulsion power plant having a jet pipe and nozzle for the rearward discharge of a propulsive jet stream, a jet spoiler comprising a hollow substantially cylindrical member coaxially disposed around the rearward end of the jet pipe, said cylindrical member being bisected in an axial plane and the two parts thereof having a rearward common diameter lying in said plane and being pivotally jointed together where they meet at their rearward extremities on said plane, each being pivotable about substantially said common diameter in said plane from said position in which they form a cylindrical member to a spoiling position in which they lie end to end transverse to the jet stream with their concave sides facing upstream, and linkage mechanism connected to said parts and operable to move them between said two positions.

6. In an aircraft jet propulsion power plant having a jet pipe and nozzle for the rearward discharge of a propulsive jet stream, a jet spoiler comprising a hollow elongated substantially circular-section tubular member coaxially disposed around the jet stream, said tubular member being bisected on an axial plane and the two parts thereof having a rearward common diameter lying in said plane and being pivotally jointed together where they meet at said rearward common diameter in said plane, a pair of links for each of said parts, one on each side thereof, each pair being pivoted at one end to the associated part of the tubular member on a transverse axis parallel to said axial plane but located forwardly of the rearward extremity of said part, and at the other end to the jet pipe fixed structure about another parallel axis, located still further forward, and an actuating member connected to said two parts on said rearward common diameter, said member being movable in a direction parallel to the jet stream and said parts being pivotable substantially about said rearward common diameter through 90° from said position where they form the tubular member to a spoiling position in which they lie end to end transversely across the jet stream with their concave sides facing upstream, when the actuating member is moved forwardly, and back again when the actuating member is moved rearwardly.

7. In an aircraft jet propulsion power plant having a jet pipe and nozzle for the rearward discharge of a propulsive jet stream, a jet spoiler comprising two similar spoiling members symmetrically disposed on either side of an axial plane of the jet pipe, each said member being shaped to form its non-spoiling position part of an elongated substantially circular-section tubular member coaxially disposed around the jet stream, and said members meeting and having a common diameter in said axial plane at their rearward extremities, and being pivotally jointed together at each end of said common diameter in said axial plane, each spoiling member being pivotable about substantially said diameter from said position in which they each form part of said tubular member to a spoiling position in which they lie end to end transverely to the jet stream with their concave sides facing upstream, and linkage mechanism connected to the spoiling members and operable to move them between said two positions.

References Cited in the file of this patent
UNITED STATES PATENTS

| | | |
|---|---|---|
| 1,306,913 | Kitchen | June 17, 1919 |
| 1,415,705 | Rees | May 9, 1922 |
| 1,572,812 | Rees | Feb. 9, 1926 |
| 2,518,697 | Lee | Aug. 15, 1950 |
| 2,551,372 | Haltenberger | May 1, 1951 |
| 2,620,622 | Lundberg | Dec. 9, 1952 |